(12) United States Patent
Asai

(10) Patent No.: US 7,527,853 B2
(45) Date of Patent: May 5, 2009

(54) CONDUCTIVE LAMINATED FILM

(75) Inventor: Masato Asai, Anpachi-gun (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 0 days.

(21) Appl. No.: 11/795,565

(22) PCT Filed: Jan. 30, 2006

(86) PCT No.: PCT/JP2006/301909

§ 371 (c)(1),
(2), (4) Date: Jul. 19, 2007

(87) PCT Pub. No.: WO2006/082944

PCT Pub. Date: Aug. 10, 2006

(65) Prior Publication Data

US 2008/0138597 A1 Jun. 12, 2008

(30) Foreign Application Priority Data

Feb. 7, 2005 (JP) ............................. 2005-030238
Apr. 12, 2005 (JP) ............................. 2005-114471

(51) Int. Cl.
*B32B 27/08* (2006.01)
*B32B 27/18* (2006.01)
*B32B 27/20* (2006.01)
*B32B 27/30* (2006.01)
*B32B 27/36* (2006.01)

(52) U.S. Cl. ...................... 428/212; 428/213; 428/216; 428/323; 428/328; 428/331; 428/447; 428/480; 428/482; 428/483; 428/918; 525/165; 525/173; 525/174; 525/175; 525/176

(58) Field of Classification Search ...................... None
See application file for complete search history.

(56) References Cited

U.S. PATENT DOCUMENTS 4,959,430 A 9/1990 Jonas et al.

(Continued)

FOREIGN PATENT DOCUMENTS

JP 1-313521 A 12/1989

(Continued)

OTHER PUBLICATIONS

Partial English language translation of JP-A-2003-334912.

(Continued)

*Primary Examiner*—Vivian Chen
(74) *Attorney, Agent, or Firm*—Sughrue Mion, PLLC

(57) ABSTRACT

There is provided a conductive film which is formed by laminating an anchor coating layer containing a polyester resin and an acrylic resin having an oxazoline group and a polyalkylene oxide chain as constituents and a transparent conductive coating layer on at least one surface of a base material film in this order and which has a total light transmittance of at least 60% and a surface resistance value of $1 \times 10^1$ to $1 \times 10^4 \Omega/\square$ This conductive film has excellent transparency and conductivity, can retain a satisfactory conductive performance even when an external force is applied since adhesion between the base material and the transparent conductive coating layer is good, and is suitably used as a transparent electrode or electromagnetic shielding material for a liquid crystal display (LCD), transparent touch panel, organic electroluminescent device and inorganic electroluminescent lamp.

9 Claims, 1 Drawing Sheet

U.S. PATENT DOCUMENTS

| | | | |
|---|---|---|---|
| 6,084,040 A * | 7/2000 | Jonas et al. | 525/535 |
| 6,469,267 B1 | 10/2002 | Welsh et al. | |
| 6,590,622 B1 | 7/2003 | Nakanishi et al. | |
| 6,926,945 B2 * | 8/2005 | Yano et al. | 428/141 |
| 7,022,388 B2 * | 4/2006 | Hashimoto et al. | 428/34.9 |
| 7,026,035 B2 * | 4/2006 | Yano et al. | 428/141 |
| 7,378,157 B2 * | 5/2008 | Sakakura et al. | 428/451 |
| 2002/0002287 A1 | 1/2002 | Jonas | |
| 2003/0161941 A1 | 8/2003 | Kirchmeyer et al. | |
| 2004/0013892 A1 * | 1/2004 | Yano et al. | 428/482 |
| 2004/0246238 A1 * | 12/2004 | Oya et al. | 345/173 |
| 2004/0265539 A1 | 12/2004 | Hashimoto et al. | |
| 2005/0019555 A1 * | 1/2005 | Yano et al. | 428/328 |

FOREIGN PATENT DOCUMENTS

| | | |
|---|---|---|
| JP | 2000-207128 A | 7/2000 |
| JP | 2002-109998 A | 4/2002 |
| JP | 2002-193972 A | 7/2002 |
| JP | 2003-286336 A | 10/2003 |
| JP | 2003-292655 A | 10/2003 |
| JP | 2003-321561 A | 11/2003 |
| JP | 2003-334912 A | 11/2003 |
| JP | 2003-344608 A | 12/2003 |
| JP | 2004-009362 * | 1/2004 |
| JP | 2004-9362 A | 1/2004 |

OTHER PUBLICATIONS

Partial English language translation of JP-A-2003-321561.
Partial English language translation of JP-A-2003-292655.
Partial English language translation of JP-A-2003-344608.

* cited by examiner

CONDUCTIVE LAMINATED FILM

FIELD OF THE INVENTION

This invention relates to a conductive film. More specifically, this invention relates to a transparent conductive film which is excellent in transparency, conductivity and durability and can be suitably used as a transparent electrode or electromagnetic shielding material for a liquid crystal display (LCD), transparent touch panel, organic electroluminescent device and inorganic electroluminescent lamp.

BACKGROUND ART

Heretofore, a transparent conductive film has been suitably used as a transparent electrode or electromagnetic shielding material for a liquid crystal display, transparent touch panel or the like. As the transparent conductive film, a film formed by coating at least one surface of a transparent film such as polyethylene terephthalate (PET) or triacetyl cellulose (TAC) with indium oxide ($In_2O_3$), tin oxide ($SnO_2$), a sintered mixture (ITO) of $In_2O_3$ and $SnO_2$ by a dry process such as vacuum deposition, sputtering or ion plating is known.

However, when the transparent conductive film is used as a transparent electrode or electromagnetic shielding material, it is generally subjected to continuous processing or punching in the form of a web or used or stored in a bent state during a surface treatment. Thus, the above transparent conductive film obtained by the dry process cracks during the above processing or storage, resulting in an increase in surface resistance.

Further, when a metal oxide such as ITO is used as a transparent conductive material, for example, the refractive index of ITO is so high as about 1.8 that surface reflectivity becomes high, whereby sufficient transmittance cannot be obtained. Accordingly, there has been proposed a method of obtaining a conductive film having high transmittance by forming a low refractive layer such as silica, and a high refractive layer such as titanium oxide as required, between an ITO layer and a base material film so as to develop an antireflective effect (refer to Japanese Patent Laid-Open Publication No. 207128/2000).

Meanwhile, in a transparent conductive coating layer formed by coating a transparent base material film with a conductive polymer (wet process), the coating layer is flexible and hardly has a problem such as cracking. Further, the process of obtaining the transparent conductive film by applying a conductive polymer has advantages that its production cost is relatively low as compared with a dry process and that it is highly productive since coating speed is generally high. Polythiophene, polyaniline, polypyrrole and the like which have been generally used in such a transparent conductive film obtained by application of a conductive polymer have problems that their use is limited to an antistatic application and the like because high conductivity cannot be obtained in the initial stage of development and that the hue of the conductive coating layer itself is unsatisfactory. However, these problems have been recently improved by improvements of production processes. For example, a conductive polymer (refer to Japanese Patent Laid-Open Publication No. 1-313521) comprising polyanions and poly(3,4-dialkoxythiophene) obtained by oxidative-polymerizing 3,4-dialkoxythiophene in the presence of polyanions shows very low surface resistance while keeping high light transmittance due to improvements of production processes in recent years (refer to Japanese Patent Laid-Open Publications Nos. 193972/2002 and 286336/2003).

However, when conductive films using these conductive polymers as a transparent conductive coating layer are applied to various applications, there is a problem of performance degradation caused by separation between the transparent conductive coating layer and the base material film by application of an external force. A representative example of applying the conductive film using the conductive polymer to an application in which an external force is aggressively applied to the film is a touch panel. Although it is proposed in Japanese Patent Laid-Open Publication No. 109998/2002, the above problem is not mentioned.

Further, because the transparent conductive coating layer of the conductive films using these conductive polymers as the transparent conductive coating layer has a low refractive index of around 1.5, it is difficult to improve antireflectivity and light transmittance by placing a layer having a lower refractive index between the conductive coating layer and the base material film. Further, no highly productive process has been found even in a case where an antireflective effect is developed by a combination of the conductive coating layer with a material having a high refractive index. It is the current situation that no conductive film which has sufficiently controlled surface reflectivity and is also highly useful has been proposed.

DISCLOSURE OF THE INVENTION

The present invention has been conceived in view of the above background art. An object of the present invention is to provide a conductive film that has excellent transparency and conductivity, shows good adhesion between a base material and a transparent conductive coating layer and can retain a conductive performance satisfactorily even when an external force is applied.

Another object of the present invention is to provide a conductive film having controlled surface reflection and showing excellent transparency.

Other objects and advantages of the present invention will become apparent from the following description.

According to the present invention, the above objects and advantages of the present invention are achieved by a conductive laminated film which comprises:

a base material film, an intermediate layer that comprises a resin composition containing a polyester resin and an acrylic resin having an oxazoline group and a polyalkylene oxide chain and that is situated on one or both surfaces of the base material film, and a transparent conductive coating layer situated on one of the intermediate layers, and which has a total light transmittance of at least 60% and a surface resistance value of $1\times10^1$ to $1\times10^4 \Omega/\square$

BEST MODE FOR CARRYING OUT THE INVENTION

Figure 1:
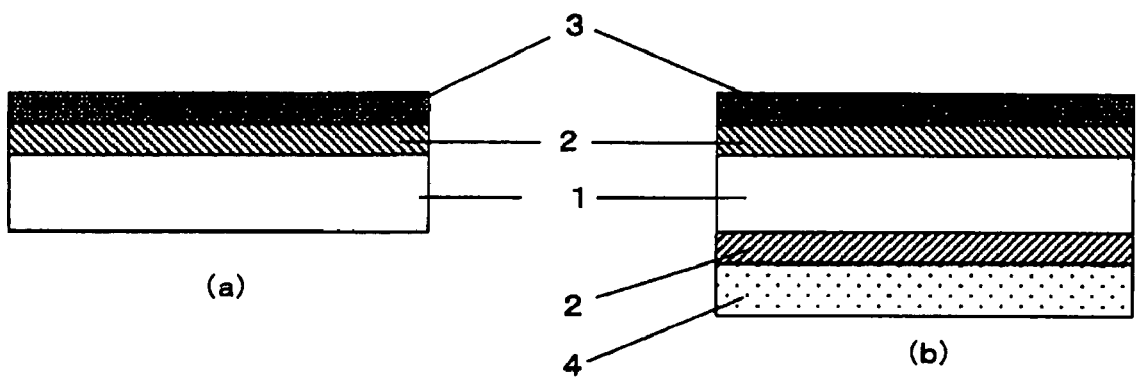
FIG. 1 is a diagram illustrating cross-sections of one example of a conductive laminated film of the present invention.

First, a conductive laminated film of the present invention will be described by use of the drawings. FIG. 1 is a diagram illustrating cross-sections of the conductive laminated film of the present invention. FIG. 1 shows one example of layer configuration. In FIG. 1, reference numeral 1 denotes a base material film, 2 an intermediate layer, 3 a transparent conductive coating layer, and 4 a hard-coating layer. As can be seen from FIG. 1, the conductive laminated film of the present invention is formed by laminating the intermediate layer on at least one surface of the base material film and laminating the transparent conductive coating layer on the intermediate layer. With such a configuration, the conductive laminated film of the present invention may have other functional layer such as a hard-coating layer as long as the objects of the present invention are not impaired. FIG. 1(b) shows an example in which the intermediate layer and the hard-coating layer are formed on the side opposite to the side on which the transparent conductive coating layer is formed.

Thus, in the conductive laminated film of the present invention, the intermediate layer containing a polyester resin and an acrylic resin having an oxazoline group and a polyalkylene oxide chain as constituents and the transparent conductive coating layer are laminated on at least one surface of the base material film in this order. When the intermediate layer is situated only on the opposite surface of the base material film, for instance, the effect of making the transparent conductive coating layer adhere to the base material film by the intermediate layer cannot be developed disadvantageously.

Further, the conductive laminated film of the present invention having the above laminated structure must have a total light transmittance of at least 60%. When the total light transmittance is lower than 60%, satisfactory transparency is difficult to obtain when the conductive laminated film is used as a transparent electrode or electromagnetic shielding material for a liquid crystal display, transparent touch panel and the like. The total light transmittance is preferably at least 65%, particularly preferably at least 70%. The total light transmittance can be adjusted properly by selection of the base material film and the transparent conductive coating layer as described hereinafter.

Further, the surface resistance of the transparent conductive coating layer of the conductive laminated film of the present invention ranges from $1 \times 10^1$ to $1 \times 10^4 \Omega/\square$ When the surface resistance is higher than the upper limit, the conductive laminated film does not function as an electrode satisfactorily or a sufficient electromagnetic shielding property cannot be obtained when the film is used as a transparent electrode or electromagnetic shielding material for a liquid crystal display, transparent touch panel or the like. Meanwhile, when the surface resistance is lower than the lower limit, the production process is liable to become unstable disadvantageously. The surface resistance is preferably $1 \times 10^1$ to $5 \times 10^3 \Omega/\square$ particularly preferably $1 \times 10^1$ to $1 \times 10^3 \Omega/\square$ Hereinafter, each layer constituting the conductive laminated film of the present invention will be further described.

The transparent conductive coating layer in the present invention is not particularly limited as long as it can lower surface resistance and has transparency.

The transparent conductive coating layer comprises a conductive polymer which comprises a polythiophene polycation (hereinafter may be referred to as "poly(3,4-di-substituted thiophene)") having a recurring unit represented by the following formula (1)

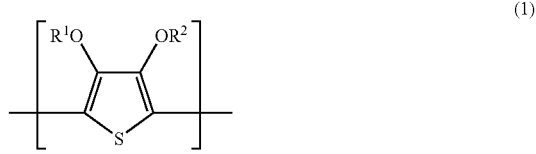

wherein $R^1$ and $R^2$ each independently represent a hydrogen atom or an alkyl group having 1 to 4 carbon atoms or join together to represent a $C_1$ to $C_{12}$ alkylene group which may be substituted, and a polyanion. That is, this conductive polymer is preferably a complex compound of a poly(3,4-di-substituted thiophene) and a polyanion.

$R^1$ and $R^2$ of the poly(3,4-di-substituted thiophene) constituting the conductive polymer each independently represent a hydrogen atom or an alkyl group having 1 to 4 carbon atoms or join together and represent a $C_1$ to $C_{12}$ alkylene group which may be substituted. A representative example of the $C_1$ to $C_{12}$ alkylene group which is formed by $R^1$ and $R^2$ joining together and may have a substituted group is a 1,2-alkylene group such as 1,2-cyclohexylene and 2,3-butylene. Suitable examples of the $C_1$ to $C_{12}$ alkylene group formed by $R^1$ and $R^2$ joining together include methylene, 1,2-ethylene and 1,3-propylene groups. Of these, the 1,2-ethylene group is particularly suitable. Specific examples thereof include a methylene group which may be alkyl-substituted, and a 1,2-ethylene group and 1,3-propylene group which may be substituted with an alkyl group having 1 to 12 carbon atoms or a phenyl group.

Meanwhile, illustrative examples of the polyanion constituting the conductive polymer include polymeric carboxylic acids such as a polyacrylic acid, polymethacrylic acid and polymaleic acid, and polymeric sulfonic acids such as a polystyrene sulfonic acid and polyvinyl sulfonic acid. These polymeric carboxylic acids or sulfonic acids may be copolymers of vinyl carboxylic acid or vinyl sulfonic acid and other polymerizable low-molecular-weight compound such as acrylate or styrene. Of these polyanions, the polystyrene sulfonic acid and polystyrene sulfonic acid all or part of which is a metal salt are preferably used.

As a coating composition for forming the transparent conductive coating layer, a dispersion having the above conductive polymer as a main component dispersed in water is used. To the coating composition, an appropriate organic polymeric material such as a polyester, polyacryl, polyurethane, polyvinyl acetate or polyvinyl butyral can be added as a binder as required.

Further, to the coating composition, an appropriate solvent having compatibility with water can be optionally added so as to dissolve the binder or to improve wettability to the base material film or to adjust solid concentration. For example, alcohols such as methanol, ethanol, propanol and isopropanol, and amides such as formamide, N,N-dimethyl formamide, acetamide, N-methyl acetamide, N,N-dimethyl acetamide and N-methyl propionamide are preferably used.

Further, to improve the strength of the transparent conductive coating layer to be obtained, an alkoxysilane or acyloxysilane may also be added to the coating composition. These silane compounds exist in the transparent conductive coating layer in the form of a hydrolyzed and condensed reaction product. Illustrative examples of these silane compounds include methyl triacetoxysilane, dimethyl diacetoxysilane, trimethyl acetoxysilane, tetraacetoxysilane, tetramethoxysilane, tetraethoxysilane, tetraisopropoxysilane, tetraisobutoxysilane, methyl triethoxysilane, dimethyl diethoxysilane, trimethyl ethoxysilane, phenyl triethoxysilane, and trialkoxysilanes having a reactive functional group other than an alkoxy group such as γ-glycidoxypropyl trimethoxysilane and vinyl triethoxysilane. Of these, tetraalkoxysilanes such as tetramethoxysilane, tetraethoxysilane, tetraisopropoxysilane and tetraisobutoxysilane and the trialkoxysilanes having a reactive functional group other than an alkoxy group such as γ-glycidoxypropyl trimethoxysilane and vinyl triethoxysilane are preferred, and trialkoxysilanes having a glycidoxy group are particularly preferred. The silane compound is suitably added in an amount of not larger than 50 wt %, particularly suitably 10 to 40 wt %, based on the weight of the conductive polymer.

To carry out hydrolysis/condensation of the silane compound efficiently, a catalyst is preferably used. As the catalyst, an acidic catalyst or a basic catalyst may be used. As the acidic catalyst, inorganic acids such as sulfuric acid, hydrochloric acid and nitric acid and organic acids such as acetic acid, citric acid, propionic acid, oxalic acid and p-toluene sulfonic acid are suitable, for example. Meanwhile, as the basic catalyst, organic amine compounds such as ammonia, triethylamine and tripropylamine, and alkali metal compounds such as sodium methoxide, potassium methoxide, potassium ethoxide, sodium hydroxide and potassium hydroxide are suitable, for example.

Further, to the above coating composition for forming the transparent conductive coating layer, a small amount of a surfactant may be added to improve wettability to the base material film. Preferred examples of the surfactant include nonionic surfactants such as polyoxyethylene alkylphenyl ether, polyoxyethylene alkyl ether and sorbitan fatty acid ester, and fluorochemical surfactants such as fluoroalkyl carboxylate, perfluoroalkyl benzene sulfonate, perfluoroalkyl quaternary ammonium salt and perfluoroalkyl polyoxyethylene ethanol.

As a coating method for forming the transparent conductive coating layer, a method known per se can be used. Preferred examples of the coating method include a lip direct method, a comma coater method, a slit reverse method, a die coater method, a gravure roll coater method, a blade coater method, a spray coater method, an air knife coating method, a dip coating method and a bar coating method. When a thermosetting resin is used as a binder, a coating solution containing components forming the additives is applied to the base material film and dried by heating to form a coating solution as the transparent conductive coating layer. The applied solution is heated preferably at 80 to 160° C. for 10 to 120 seconds, particularly preferably at 100 to 150° C. for 20 to 60 seconds. When an ultraviolet (UV) curable resin or an electron beam (EB) curable resin is used as a binder, it is generally practiced that irradiation with ultraviolet radiation or irradiation with an electron beam is carried out after predrying.

Further, when the coating solution for forming the transparent conductive coating layer is applied on the intermediate layer to be described later, the surface of the intermediate layer may be subjected to a physical surface treatment such as a corona discharge treatment or plasma discharge treatment as a preliminary treatment for further improving adhesion and coatability as required.

The thickness of the transparent conductive coating layer is preferably 0.01 to 0.30 μm, particularly preferably 0.02 to 0.25 μm. When the thickness of the coating film is too small, satisfactory conductivity may not be obtained, while when it is too large, total light transmittance may be insufficient or blocking may occur.

In the present invention, to improve adhesion between the transparent conductive coating layer and the base material film, the intermediate layer, i.e. the intermediate layer for securing the transparent conductive coating layer on the base material film must be provided between the transparent conductive coating layer and the base material film. The thickness of the intermediate layer is preferably 0.01 to 0.30 μm, more preferably 0.02 to 0.25 μm. When this thickness is too small, adhesion degrades, while when it is too large, blocking may occur or a haze value may become high. Further, the refractive index of the intermediate layer is 1.53 to 1.63, preferably 1.55 to 1.62, and its thickness is preferably 0.01 to 0.10 μm, preferably 0.02 to 0.10 μm, from the viewpoint of an antireflective effect. When the refractive index is out of the above range, the antireflective effect by optical interference of the intermediate layer in combination with the transparent conductive coating layer is liable to become unsatisfactory. Meanwhile, when the thickness is out of the above range, the optical interference effect is difficult to develop. The intermediate layer contains both a polyester resin and an acrylic resin having an oxazoline group and a polyalkylene oxide chain as constituents.

The polyester resin used here is not particularly limited and can be exemplified by polyesters comprising the following polybasic acids and polyols. In particular, polyesters which are soluble or dispersible in water or water containing a small amount of an organic solvent are preferred.

Illustrative examples of the polybasic acid component of the polyester resin include terephthalic acid, isophthalic acid, phthalic acid, phthalic anhydride, 2,6-naphthalene dicarboxylic acid, 1,4-cyclohexane dicarboxylic acid, adipic acid, sebacic acid, trimellitic acid, pyromellitic acid, dimer acid, and 5-sodium sulfoisophthalic acid. In particular, copolyesters containing two or more of these acid components are preferred. Further, an unsaturated polybasic acid component such as maleic acid or itaconic acid and a hydroxycarboxylic acid component such as p-hydroxybenzoic acid may be contained in a slight amount.

Meanwhile, illustrative examples of the polyol component include ethylene glycol, 1,4-butanediol, diethylene glycol, dipropylene glycol, 1,6-hexanediol, 1,4-cyclohexane dimethanol, xylylene glycol, dimethylol propane, poly(ethyleneoxide)glycol, and poly(tetramethyleneoxide)glycol.

Meanwhile, as the acrylic resin having an oxazoline group and a polyalkylene oxide chain which is used in the intermediate layer, acrylic resins which are soluble or dispersible in water or water containing a small amount of an organic solvent are preferred. Illustrative examples of the acrylic resin having an oxazoline group and a polyalkylene oxide chain include acrylic resins containing the following monomers as copolymerizable components.

Illustrative examples of monomers having an oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-methyl-2-oxazoline. These monomers can be used alone or in admixture of two or more. Of these, 2-isopropenyl-2-oxazoline is industrially easy to obtain and suitable. By use of the acrylic resin having an oxazoline group, the cohesion of the intermediate layer improves, and adhesion of the intermediate layer to the transparent conductive coating layer becomes stronger. Further, abrasion resistance to a metal roll in a film formation process or transparent conductive coating layer formation process can be imparted to the surface of the base material film. The content of the monomer containing an oxazoline group is preferably 2 to 40 wt %, more preferably 3 to 35 wt %, much more preferably 5 to 30 wt %, as the content in the acrylic resin.

Illustrative examples of monomers having a polyalkylene oxide chain include esters resulting from adding a polyalkylene oxide to the carboxyl group of acrylic acid or methacrylic acid. Illustrative examples of the polyalkylene oxide chain include polymethylene oxide, polyethylene oxide, polypropylene oxide and polybutylene oxide. The recurring unit of the polyalkylene oxide chain is preferably 3 to 100. When the acrylic resin having the polyalkylene oxide chain is used, compatibility between the polyester resin and the acrylic resin in the intermediate layer becomes higher than that when an acrylic resin which does not contain the polyalkylene oxide chain, and the transparency of the intermediate layer can be improved. When the recurring unit of the polyalkylene oxide chain is less than 3, the compatibility between the polyester resin and the acrylic resin degrades and the transparency of the intermediate layer is liable to deteriorate, while when it is more than 100, the resistance to heat and moisture of the intermediate layer degrades and adhesion of the intermediate layer to the transparent conductive coating layer at high temperatures and high humidity is liable to deteriorate. The content of the monomer having the polyalkylene oxide chain is preferably 3 to 40 wt %, more preferably 4 to 35 wt %, much more preferably 5 to 30 wt %, as the content in the acrylic resin.

Illustrative examples of other copolymerizable components which may be contained in the acrylic resin include the following monomers, i.e. alkyl acrylates and alkyl methacrylates (wherein the alkyl group is a methyl, ethyl, n-propyl, isopropyl, n-butyl, isobutyl, t-butyl, 2-ethylhexyl or cyclohexyl group, for example); hydroxy-group-containing monomers such as 2-hydroxyethyl acrylate, 2-hydroxyethyl methacrylate, 2-hydroxypropyl acrylate and 2-hydroxypropyl methacrylate; epoxy-group-containing monomers such as glycidyl acrylate, glycidyl methacrylate and allyl glycidyl ether; monomers having a carboxy group, sulfonic acid group or salt thereof such as acrylic acid, methacrylic acid, itaconic acid, maleic acid, fumaric acid, crotonic acid, styrenesulfonic acid and salts thereof (such as a sodium salt, potassium salt, ammonium salt and tertiary amine salt); monomers having an amide group such as acrylamide, methacrylamide, N-alkyl acrylamide, N-alkyl methacrylamide, N,N-dialkyl acrylamide, N,N-dialkyl methacrylamide (wherein the alkyl group is a methyl, ethyl, n-propyl, isopropyl, n-butyl, isobutyl, t-butyl, 2-ethylhexyl or cyclohexyl group, for example), acryloyl morpholine, N-methylol acrylamide, N-methylol methacrylamide, N-phenyl acrylamide and N-phenyl methacrylamide; acid anhydride monomers such as maleic anhydride and itaconic anhydride; and vinyl isocyanate, allyl isocyanate, styrene, vinylmethyl ether, vinylethyl ether, vinyl trialkoxysilane, alkyl maleic monoester, alkyl fumaric monoester, alkyl itaconic monoester, acrylonitrile, methacrylonitrile, vinylidene chloride, ethylene, propylene, vinyl chloride, vinyl acetate and butadiene.

The content of the polyester resin forming the intermediate layer in the intermediate layer is preferably 5 to 95 wt %, particularly preferably 50 to 90 wt %. The content of the acrylic resin having an oxazoline group and a polyalkylene oxide chain which forms the intermediate layer in the intermediate layer is preferably 5 to 90 wt %, particularly preferably 10 to 50 wt %. When the content of the polyester resin is higher than 95 wt % or the content of the acrylic resin having an oxazoline group and a polyalkylene oxide chain is lower than 5 wt %, the cohesion of the intermediate layer degrades, and the adhesion of the transparent conductive coating layer may become insufficient. Meanwhile, when the content of the polyester resin is lower than 5 wt % or the content of the acrylic resin having an oxazoline group and a polyalkylene oxide chain is higher than 90 wt %, the adhesion of the transparent conductive coating layer may become insufficient.

In the present invention, aliphatic wax is preferably contained in the above intermediate layer in an amount of 0.5 to 30 wt %, particularly preferably 1 to 10 wt %. When this amount is smaller than 0.5 wt %, an effect of improving the slipperiness of the surface of the film may not be developed. Meanwhile, when it is larger than 30 wt %, adhesion of the intermediate layer to the base material film and a capability of anchoring the transparent conductive coating layer to the base material may be unsatisfactory.

Specific examples of aliphatic wax which is preferably used include plant waxes such as carnauba wax, candelilla wax, rice wax, sumac wax, jojoba oil, palm wax, rosin modified wax, auriculy wax, sugarcane wax, esparto wax and bark wax; animal waxes such as beeswax, lanolin, whale wax and shellac wax; mineral waxes such as montan wax, ozocerite and ceresin wax; petroleum waxes such as paraffin wax, microcrystalline wax and petrolactam; and synthetic hydrocarbon waxes such as Fischer-Tropsch wax, polyethylene wax and polypropylene wax. Of these, carnauba wax, paraffin wax and polyethylene wax are preferred because they have good slipperiness on the transparent conductive coating layer. These waxes are preferably used as a water dispersion from the viewpoints of environmental problems and ease of handling in particular.

Further, fine particles having an average particle diameter of 0.005 to 0.5 μm are preferably contained in the above intermediate layer in an amount of 0.1 to 20 wt %. When the content of the fine particles in the intermediate layer is lower than 0.1 wt %, the slipperiness of the film degrades, so that the film may become difficult to roll up, while when it is higher than 20 wt %, the transparency of the intermediate layer degrades, so that the conductive laminated film cannot be used in such an application as a display or touch panel. Illustrative examples of fine particles which are preferably used include inorganic fine particles such as calcium carbonate, magnesium carbonate, calcium oxide, zinc oxide, magnesium oxide, silicon oxide, silicate of soda, aluminum hydroxide, iron oxide, zirconium oxide, barium sulfate, titanium oxide, tin oxide, antimony oxide, carbon black and molybdenum disulfide, composite inorganic fine particles comprising silica and titanium oxide, and organic fine particles such as an acrylic crosslinked polymer, styrenic crosslinked polymer, silicone resin, fluorine resin, benzoguanamine resin, phenol resin, nylon resin and polyethylene wax. Of these, the composite inorganic fine particles comprising silica and titanium oxide are preferred. Further, the difference in refractive index between the polymer binder and fine particles which form the intermediate layer is preferably not larger than 0.02 from the viewpoints of the antireflective effect and haze. When the difference in refractive index becomes larger than 0.02, the transparency of the conductive film to be obtained may deteriorate.

Then, to form the above intermediate layer (hereinafter may be referred to as "coating film") on the base material film, the above components are preferably used in the form of an aqueous coating solution such as an aqueous solution, water dispersion or emulsion. To form the coating film, components other than the above components, e.g. an antistatic agent, colorant, surfactant and ultraviolet absorber, can be added as required. In particular, by adding a lubricant, blocking resistance can be further improved.

The solid concentration of the aqueous coating solution used to form the intermediate layer is preferably not higher than 20 wt %, more preferably 1 to 10 wt %. When this concentration is lower than 1 wt %, wettability to the base material film may be unsatisfactory, while when it is higher than 20 wt %, the storage stability of the coating solution and the appearance of the intermediate layer may deteriorate.

Next, the base material film in the present invention is not particularly limited. However, films comprising a (meth) acrylic resin, polystyrene, polyvinyl acetate, polyolefin such as polyethylene or polypropylene, polyvinyl chloride, polyvinylidene chloride, polyimide, polyamide, polysulfone, polycarbonate, polyester (may be a polyester copolymerized with a third component in a small amount, e.g. not larger than 20 mol %, preferably not larger than 10 mol %, based on all acid components) such as polyethylene terephthalate (hereinafter may be referred to as "PET") or polyethylene naphthalate (hereinafter may be referred to as "PEN"), resin having been partially modified by a functional group such as an amino, epoxy, hydroxyl or carbonyl group, triacetyl cellulose (TAC) or the like are suitable. Of these base material films, films comprising a polyester, particularly PET, PEN and copolymer thereof, are particularly preferred from the viewpoints of mechanical properties, transparency and production costs. Although the thickness of the base material film is not particularly limited, it is preferably not larger than 500 μm. When the thickness is larger than 500 μm, rigidity is so high that ease of handling of the film obtained in applying the film on a display or the like is liable to deteriorate.

When a polyester film is used as the base material film, application of the above aqueous coating solution for forming the intermediate layer can be carried out at any stage. It is preferably carried out in the production process of the polyester film. Further, the coating solution is preferably applied to a polyester film before completion of oriented crystallization.

Illustrative examples of the polyester film before completion of oriented crystallization include an unstretched film, a monoaxially oriented film obtained by orienting an unstretched film in either the longitudinal direction or the transverse direction, and a film stretched and oriented in both the longitudinal direction and the transverse direction at low ratios (biaxially stretched film before oriented crystallization is completed by eventually re-stretching the film in the longitudinal direction and/or the transverse direction).

In particular, it is preferred to apply the aqueous coating solution for forming the intermediate layer to an unstretched film or a monoaxially stretched film having been oriented in one direction and then subject the coated film to longitudinal stretching and/or transverse stretching and heat-setting.

When the aqueous coating solution for forming the intermediate layer is applied to the base material film, it is preferred to subject the surface of the film to a physical treatment such as a corona treatment, a flame treatment or a plasma treatment as a preliminary treatment for improving coatability or to use the composition in combination with a surfactant which is chemically inert to the composition.

The surfactant promotes wetting of the aqueous coating solution for forming the above intermediate layer to the base material film. Illustrative examples thereof include anionic and nonionic surfactants such as polyoxyethylene alkylphenyl ether, polyoxyethylene-fatty acid ester, sorbitan fatty acid ester, glycerin fatty acid ester, fatty acid metal soap, alkylsulfate, alkylsulfonate and alkyl sulfosuccinate. The surfactant is preferably contained in the composition forming the coating film in an amount of 0.1 to 10 wt %.

As a coating method for forming the intermediate layer, a method known per se can be used. Illustrative examples of the coating method include a lip direct method, a comma coater method, a slit reverse method, a die coater method, a gravure roll coater method, a blade coater method, a spray coater method, an air knife coating method, a dip coating method and a bar coating method. These methods can be used alone or in combination of two or more. The coating film may be formed on only one surface of the film or on both surfaces thereof as appropriate.

In the conductive film of the present invention, it is necessary that the intermediate layer and the transparent conductive coating layer be laminated on at least one surface of the base material film in this order, as described above. However, a coating film such as the intermediate layer or a hard-coating layer may be formed on the side opposite to the side on which the transparent conductive coating layer is formed, as required.

Further, the conductive film of the present invention preferably has a surface reflectivity at a wavelength of 550 nm of not higher than 3% and a haze value of lower than 1.5% in view of transparency.

EXAMPLES

Hereinafter, the present invention will be further described with reference to Examples. Evaluations in Examples were made in accordance with the following methods.

(1) Reflectivity, Layer Thickness, and Refractive Index of Coating Layers

The reflectivity at a wavelength of 300 to 800 nm on the transparent conductive coating layer side of a sample conductive film was measured by use of a reflection spectroscopical film thickness meter (trade name "FE-3000" of OTSUKA ELECTRONICS CO., LTD.).

Meanwhile, the layer thicknesses and refractive indices of an intermediate layer and transparent conductive coating layer were determined by using the n-k Cauchy's dispersion formula as a typical approximation formula of wavelength dispersion of refractive index for the above measured reflectivity values and fitting them to actual measurement values of spectrum.

Further, thicknesses of three points which were arbitrarily selected on a hard-coating layer were measured by film-thickness gauge and the average of the thicknesses was used as the thickness of the hard-coating layer.

<Reflectivity>

Reflectivity at 550 nm is 3% or lower . . . Surface reflection is sufficiently low.

Reflectivity at 550 nm is higher than 3% . . . Surface reflection is high.

(2) Refractive Index of Fine Particles

Fine particles dried at 90° C. were suspended in various 25° C. liquids having different refractive indices, and the refractive index of liquid whose suspension appeared to be the most transparent was measured by an Abbe's refractometer (D ray: 589 nm)

(3) Glass Transition Temperature

About 10 mg of sample was filled in an aluminum pan for measurement, and the pan was attached to a differential calorimeter (V4.0B2000 DSC of E.I. Du Pont De Nemors Co., Ltd.) and heated from 25° C. to 300° C. at a rate of 20° C./min.

After kept at 300° C. for 5 minutes, it was taken out and immediately placed on ice for quenching. This pan was attached to the differential calorimeter again and heated from 25° C. to 300° C. at a rate of 20° C./min to measure glass transition temperature (Tg: ° C.)

(4) Intrinsic Viscosity

Intrinsic viscosity ([η] dl/g) was measured in an o-chlorophenol solution at 25° C.

(5) Haze Value

This was measured by use of a hazemeter HCM-2B of SUGA TEST INSTRUMENTS CO., LTD. in accordance with JIS K7150 and evaluated based on the following criteria.
Haze<1.5% . . . Turbidity is sufficiently low.
Haze≦=1.5% . . . Turbidity is high.

(6) Total Light Transmittance

This was measured by use of a hazemeter HCM-2B of SUGA TEST INSTRUMENTS CO., LTD. in accordance with JIS K7150 and evaluated based on the following criteria.
Total Light Transmittance≧60% . . . Transparency is good.

Total Light Transmittance<60% . . . Transparency is poor.

(7) Adhesion

A transparent conductive coating layer was formed on the intermediate-layer-formed surface of a base material film in the manner described in Examples and Comparative Examples and cross-cut into a grid (comprising 100 sections each having a size of 1 mm$^2$) and a cellophane tape (product of Nichiban Co., Ltd.) having a width of 24 mm was placed thereon and peeled at a breath at a peeling angle of 180°. The peeled surface was observed and evaluated based on the following criteria.
5: Peeled area is less than 10% . . . Adhesion is very good.
4: Peeled area is 10% to less than 20% . . . Adhesion is good.
3: Peeled area is 20% to less than 30% . . . Adhesion is somewhat good.
2: Peeled area is 30% to less than 40% . . . Adhesion is poor.
1: Peeled area is 40% or more . . . Adhesion is very poor.

(8) Pen-Based Input Sliding Endurance

As a measure of the degree of deterioration of conductivity when an external force is applied to a conductive film, a model touch panel was prepared, and a pen-based input sliding endurance test was conducted. In the pen-based input sliding endurance test, a sample conductive film was cut into a size of 100 mm×100 mm, and electrodes having a width of 5 mm were prepared on both ends of the transparent-conductive-coating-layer-formed surface by applying silver paste. 5 V was applied between these electrodes from a constant voltage source, and a voltage $V_{i,j}$ (i, j=1 to 50) was measured at 2,500 points of (x1, y1) to (x50, y50) which were situated in a sample central area of 50 mm×50 mm at intervals of 1 mm in the longitudinal and transverse directions. A difference from a theoretical voltage $U_{i,j} = V_{1,1} + (V_{50,50} - V_{1,1})/50 \times (j-1)$ at each voltage measuring point was defined by $\Delta_{i,j} = (V_{i,j} - U_{i,j})/U_{i,j}$, and the largest absolute value of this $\Delta_{i,j}$ was defined as linearity.

By use of a film whose linearity before the pen-based input test was measured, a touch panel was prepared in the manner described in Examples and Comparative Examples. The pen-based input test was conducted by writing the first to last letters in katakana in a size of 2 cm$^2$ in an area where measurement of linearity was conducted, from the panel board side constituted by the conductive film, by a plotter using a touch pen made of a polyacetal resin and having a pen tip radius of 0.8 mm. In the test, the pen load was 250 gf, and the letter writing speed was 2,000 letters/hour. After completion of writing, the conductive film was taken out of the touch panel, and the linearity of the conductive film after the pen-based input test was measured in the same manner as described above. This evaluation was made for various numbers of letters, and the number of letters when the linearity exceeded 3% was taken as a pen-based input endurance letter number and evaluated based on the following criteria.

100,000 letters<pen-based input endurance letter number . . . Resistance to external force is very good. 50,000 letters≦pen-based input endurance letter number≦100,000 letters . . . Resistance to external force is good.

pen-based input endurance letter number<50,000 letters . . . Resistance to external force is poor.

(9) Surface Resistance

This was measured by use of Lorester MCP-T600 of Mitsubishi Chemical Corporation in accordance with JIS K7194. Measurement was made at 5 spots which were arbitrarily selected, and the average of the measurement values was taken.

Example 1

Formation of Base Material Film and Intermediate Layer

A molten polyethylene terephthalate ([η]=0.62 dl/g, Tg=78° C.) was extruded from a die and cooled on a cooling drum in the usual manner to form an unstretched film. Then, after the unstretched film was stretched to 3.4 times in the longitudinal direction, an 8% aqueous coating solution of a coating solution 1 which was shown in Table 1 was applied on both surfaces of the film uniformly by a roll coater. After application of the solution, this film was stretched to 3.6 times in the transverse direction at 125° C. and then shrunk by 3% in the width direction at 220° C. to be heat-set. Thereby, a base material film having an intermediate layer formed thereon and having a thickness of 188 μm was obtained. The thickness of the coating layer was 0.15 μm.

TABLE 1

| | Composition of Transparent Conductive Coating Layer (wt %) | | | | | | | |
|---|---|---|---|---|---|---|---|---|
| Coating Solution | Polyester 1 | Polyester 2 | Acryl 1 | Acryl 2 | Acryl 3 | Additive 1 | Additive 2 | Wetting agent |
| Coating Solution 1 | 65 | | 30 | | | | | 5 |
| Coating Solution 2 | | 65 | 30 | | | | | 5 |
| Coating Solution 3 | 60 | | 30 | | | 5 | | 5 |
| Coating Solution 4 | 55 | | 30 | | | 5 | 5 | 5 |
| Coating Solution 5 | 65 | | | 30 | | | | 5 |
| Coating Solution 6 | 65 | | | | 30 | | | 5 |

Polyester 1 comprises 65 mol % of 2,6-naphthalene dicarboxylic acid, 30 mol % of isophthalic acid and 5 mol % of 5-sodium sulfoisophthalic acid as acid components and 90 mol % of ethylene glycol and 10 mol % of diethylene glycol as glycol components and has a Tg of 80° C. and an average molecular weight of 13,000.

Polyester 1 was produced in the following manner in accordance with a method described in Example 1 in Japanese Patent Laid-Open Publication No. 6-116487. That is, 44 parts of dimethyl 2,6-naphthalene dicarboxylate, 16 parts of dimethyl isophthalate, 4 parts of dimethyl 5-sodium sulfoisophthalate, 34 parts of ethylene glycol and 2 parts of diethylene glycol were charged into a reactor, 0.05 parts of tetrabutoxytitanium was added thereto, the resulting mixture was heated in a nitrogen atmosphere with the temperature controlled to 230° C., and produced methanol was distilled out to carry out a transesterification reaction. Then, the temperature of the reaction system was gradually increased to 255° C. and the pressure in the system was reduced to 1 mmHg to carry out a polycondensation reaction. Thereby, polyester 1 was obtained.

Polyester 2 comprises 60 mol % of terephthalic acid, 35 mol % of isophthalic acid and 5 mol % of 5-sodium sulfoisophthalic acid as acid components and 90 mol % of ethylene glycol and 10 mol % of diethylene glycol as glycol components and has a Tg of 45° C. and an average molecular weight of 14,000.

Polyester 2 was produced in the following manner in accordance with a method described in Example 1 in Japanese Patent Laid-Open Publication No. 6-116487. That is, 36 parts of dimethyl terephthalate, 21 parts of dimethyl isophthalate, 5 parts of dimethyl 5-sodium sulfoisophthalate, 36 parts of ethylene glycol and 2 parts of diethylene glycol were charged into a reactor, 0.05 parts of tetrabutoxytitanium was added thereto, the resulting mixture was heated in a nitrogen atmosphere with the temperature controlled to 230° C., and produced methanol was distilled out to carry out a transesterification reaction. Then, the temperature of the reaction system was gradually increased to 255° C. and the pressure in the system was reduced to 1 mmHg to carry out a polymerization reaction. Thereby, polyester 2 was obtained.

Acryl 1 comprises 30 mol % of methyl methacrylate, 30 mol % of 2-isopropenyl-2-oxazoline, 10 mol % of polyethylene oxide (n=10) methacrylate and 30 mol % of acrylamide and has a Tg of 50° C.

Acryl 1 was produced in the following manner in accordance with a method described in Production Examples 1 to 3 in Japanese Patent Laid-Open Publication No. 63-37167. That is, 3 parts of sodium lauryl sulfonate as a surfactant and 181 parts of ion exchange water were charged into a four-neck flask and heated to 60° C. in a nitrogen stream. Then, 0.5 parts of ammonium persulfate and 0.2 parts of sodium hydrogen nitrite were added as polymerization initiators, and a mixture comprising 23.3 parts of methyl methacrylate, 22.6 parts of 2-isopropenyl-2-oxazoline, 40.7 parts of polyethylene oxide (n=10) methacrylate and 13.3 parts of acrylamide which were monomers was added dropwise over 3 hours such that the temperature of the solution became 60 to 70° C. Even after completion of the dropwise addition, the solution was still allowed to react under agitation while kept within the same temperature range for 2 hours and then cooled. Thereby, an aqueous dispersion of acryl 1 with a solid content of 35% was obtained.

Acryl 2 comprises 30 mol % of methyl methacrylate, 40 mol % of 2-isopropenyl-2-oxazoline and 30 mol % of acrylamide and has a Tg of 80° C.

Acryl 2 was produced in the following manner in accordance with a method described in Production Examples 1 to 3 in Japanese Patent Laid-Open Publication No. 63-37167. That is, 3 parts of sodium lauryl sulfonate as a surfactant and 181 parts of ion exchange water were charged into a four-neck flask and heated to 60° C. in a nitrogen stream. Then, 0.5 parts of ammonium persulfate and 0.2 parts of sodium hydrogen nitrite were added as polymerization initiators, and a mixture comprising 34.9 parts of methyl methacrylate, 45.2 parts of 2-isopropenyl-2-oxazoline and 19.9 parts of acrylamide which were monomers was added dropwise over 3 hours such that the temperature of the solution became 60 to 70° C. Even after completion of the dropwise addition, the solution was still allowed to react under agitation while kept within the same temperature range for 2 hours and then cooled. Thereby, an aqueous dispersion of acryl 2 with a solid content of 35% was obtained.

Acryl 3 comprises 45 mol % of methyl methacrylate, 45 mol % of butyl acrylate, 5 mol % of glycidyl methacrylate and 5 mol % of 2-hydroxyethyl methacrylate and has a Tg of 50° C.

Acryl 3 was produced in the following manner in accordance with a method described in Production Examples 1 to 3 in Japanese Patent Laid-Open Publication No. 63-37167. That is, 3 parts of sodium lauryl sulfonate as a surfactant and 181 parts of ion exchange water were charged into a four-neck flask and heated to 60° C. in a nitrogen stream. Then, 0.5 parts of ammonium persulfate and 0.2 parts of sodium hydrogen nitrite were added as polymerization initiators, and a mixture comprising 38.7 parts of methyl methacrylate, 49.6 parts of butyl acrylate, 6.1 parts of glycidyl methacrylate and 5.6 parts of 2-hydroxyethyl methacrylate which were monomers was added dropwise over 3 hours such that the temperature of the solution became 60 to 70° C. Even after completion of the dropwise addition, the solution was still allowed to react under agitation while kept within the same temperature range for 2 hours and then cooled. Thereby, an aqueous dispersion of acryl 3 with a solid content of 35% was obtained.

Additive 1: silica filler (average particle diameter: 100 nm) (trade name: SNOWTEX ZL of NISSAN CHEMICAL INDUSTRIES, LTD.)

Additive 2: carnauba wax (trade name: SEROSOL 524 of CHUKYO YUSHI CO., LTD.)

Wetting Agent: polyoxyethylene (n=7) lauryl ether (trade name: NALOACTI N-70 of SANYO CHEMICAL INDUSTRIES, LTD.)

<Formation of Transparent Conductive Coating Layer>

A coating solution obtained by mixing 99.6 parts of polymer aqueous dispersion (Baytron P of Bayer AG) comprising 0.5 wt % of poly(3,4-ethylenedioxythiophene) and 0.8 wt % of polystyrene sulfonic acid (molecular weight Mn=150,000) as conductive polymers, with 0.4 parts of γ-glycidoxypropyl trimethoxysilane (TSL-8350 of Toshiba Silicone Co., Ltd.) as a silane compound and agitating the mixture for 1 hour was applied on the above base material film having an intermediate layer by use of a Meyer bar and dried at 140° C. for 1 minute to obtain a transparent conductive coating layer. The thickness of the transparent conductive coating layer was 0.15 μm.

<Formation of Hard Coating>

To eliminate the influence of the occurrence of irreversible depressions on the film itself when a pen-based input sliding endurance test was conducted, acrylic hard coating (trade name: BEAMSET 700 of Arakawa Chemical Industries, Ltd.) was applied to the surface opposite to the transparent conductive coating layer of the above conductive film by use of a Meyer bar, predried at 60° C. for 30 seconds and then irradiated with ultraviolet radiation with an energy of 1,000 mJ to obtain a hard coating layer. The thickness of the hard coating layer was 8 μm. The properties of the obtained conductive laminated film are shown in Table 2.

Example 2

The procedure of Example 1 was repeated except that the component of the aqueous coating solution forming the intermediate layer was changed to the coating solution 2 and the thickness of the transparent conductive coating layer was changed to 0.18 μm. The properties of the obtained conductive laminated film are shown in Table 2.

Example 3

The procedure of Example 1 was repeated except that the component of the aqueous coating solution forming the intermediate layer was changed to the coating solution 3. The properties of the obtained conductive laminated film are shown in Table 2.

Example 4

The procedure of Example 1 was repeated except that the component of the aqueous coating solution forming the intermediate layer was changed to the coating solution 4. The properties of the obtained conductive laminated film are shown in Table 2.

Example 5

A molten polyethylene-2,6-naphthalate ($[\eta]$=0.65 dl/g, Tg=121° C.) as a material to form a base material film was extruded from a die and cooled on a cooling drum in the usual manner to obtain an unstretched film. Then, the unstretched film was stretched to 3.4 times in the longitudinal direction, and an 8% aqueous coating solution of the coating solution 1 which was shown in Table 1 was then applied on both surfaces of the film uniformly by a roll coater. After application of the solution, this film was stretched to 3.6 times in the transverse direction at 125° C. and shrunk by 3% in the width direction at 220° C. to be heat-set. Thereby, a base material film having an intermediate layer formed thereon and having a thickness of 188 μm was obtained. The thickness of the coating layer was 0.15 μm. A transparent conductive coating layer was formed in the same manner as in Example 1. The properties of the obtained conductive film are shown in Table 2.

Comparative Example 1

The procedure of Example 1 was repeated expect that the intermediate layer was not formed. The properties of the obtained conductive film are shown in Table 2.

Comparative Example 2

The procedure of Example 1 was repeated except that the component of the aqueous coating solution forming the intermediate layer was changed to the coating solution 5. The properties of the obtained conductive laminated film are shown in Table 2.

Comparative Example 3

The procedure of Example 1 was repeated except that the component of the aqueous coating solution forming the intermediate layer was changed to the coating solution 6. The properties of the obtained conductive laminated film are shown in Table 2.

Comparative Example 4

The procedure of Example 1 was repeated except that the thickness of the transparent conductive coating layer was changed to 0.005 μm. The properties of the obtained conductive laminated film are shown in Table 2.

Comparative Example 5

The procedure of Example 1 was repeated except that the thickness of the transparent conductive coating layer was changed to 0.9 μm. The properties of the obtained conductive laminated film are shown in Table 2.

Example 6

The procedure of Example 1 was repeated except that the thickness of the transparent conductive coating layer was changed to 0.07 μm. The properties of the obtained conductive laminated film are shown in Table 2.

TABLE 2

| | Coating Agent | Thickness of Transparent Conductive Coating Layer (μm) | Surface Resistance ($\Omega/\square$) | Total Light Transmittance (%) | Adhesion | Pen-based Input Sliding Endurance (Number of Writings Endured) |
|---|---|---|---|---|---|---|
| Ex. 1 | Coating Solution 1 | 0.15 | 2500 | 87 | 5 | 200,000 |
| Ex. 2 | Coating Solution 2 | 0.18 | 1500 | 83 | 5 | 150,000 |
| Ex. 3 | Coating Solution 3 | 0.15 | 2500 | 87 | 5 | 150,000 |
| Ex. 4 | Coating Solution 4 | 0.15 | 2500 | 87 | 5 | 140,000 |
| Ex. 5 | Coating Solution 1 | 0.15 | 2500 | 87 | 5 | 180,000 |
| C. Ex. 1 | — | 0.15 | 2500 | 87 | 2 | 10,000 |
| C. Ex. 2 | Coating Solution 5 | 0.15 | 2500 | 87 | 2 | 30,000 |
| C. Ex. 3 | Coating Solution 6 | 0.15 | 2500 | 87 | 2 | 30,000 |
| C. Ex. 4 | Coating Solution 1 | 0.005 | 53000 | 89 | 5 | 170,000 |
| C. Ex. 5 | Coating Solution 1 | 0.9 | 450 | 55 | 5 | 160,000 |
| Ex. 6 | Coating Solution 1 | 0.07 | 6000 | 88 | 5 | 160,000 |

Ex.: Example, C. Ex.: Comparative Example

Examples 7 and 8 and Comparative Example 6

Formation of Base Material Film and Anchor Coating Layer

A molten polyethylene terephthalate ([η]=0.63 dl/g, Tg=79° C.) was extruded from a die and cooled on a cooling drum in the usual manner to form an unstretched film. Then, after the unstretched film was stretched to 3.4 times in the longitudinal direction, an aqueous coating solution shown in Table 3 was applied on both surfaces of the film uniformly by a roll coater. After application of the solution, this film was stretched to 3.6 times in the transverse direction at 125° C. and then shrunk by 3% in the width direction at 220° C. to be heat-set. Thereby, a base material film having an intermediate layer formed thereon and having a thickness of 188 μm was obtained. The thickness of the coating layer was adjusted to be values shown in Table 4 by adjusting the concentration of each coating solution.

Fine particles 1 are composite inorganic fine particles of silica and titania (average particle diameter: 100 nm). Fine particles 1 were produced in the following manner in accordance with a method described in Production Examples and Examples in Japanese Patent Laid-Open Publication No. 7-2520. That is, 140 g of methanol, 260 g of isopropanol and 100 g of ammonia water (25 wt %) were charged into a glass reactor having an inner volume of 4 liters and equipped with mixing blades to prepare a reaction solution which was then agitated with its temperature kept at 40° C. Then, 550 g of silicon tetramethoxide (Si(OMe)$_4$, Methyl silicate 39 (trade name) of COLCOAT CO., LTD.) was charged into a 3-liter conical flask, and 195 g of methanol and 28 g of 0.1-wt % hydrochloric acid solution (35% hydrochloric acid, obtained by diluting a product of Wako Pure Chemical Industries, Ltd. with water to 1/1,000) were added under agitation and agitated for about 10 minutes. Then, a solution prepared by diluting 300 g of titanium tetraisopropoxide (Ti(O-iPr)$_4$, A-1 (TPT) (trade name) of NIPPON SODA CO., LTD.) with 634 g of isopropanol was added to obtain a transparent homogeneous solution (co-condensate of silicon tetraalkoxide and titanium tetraalkoxide). 1,699 g of the above homogeneous solution and 480 g of ammonia water (25 wt %) were added dropwise to the above reaction solution in 2 hours with the drop rate set to be low initially and gradually increased toward the end. After completion of the dropwise addition, the obtained co-hydrolysate was filtered, and the organic solvent was dried at 50° C. Then, the residue was dispersed into water to obtain fine particles 1 having a concentration of 10 wt % and a refractive index of 1.57.

Fine particles 2 are an acrylic filler (average particle diameter: 100 nm, refractive index: 1.50) (MICROGEL E1002 (trade name) of Nippon Paint Co., Ltd.).

Fine particles 3 are an acrylic filler (average particle diameter: 30 nm, refractive index: 1.50) (MICROGEL E2002 (trade name) of Nippon Paint Co., Ltd.).

<Formation of Transparent Conductive Coating Layer>

A polymer aqueous dispersion (Baytron P of Bayer AG) comprising 0.5 wt % of poly(3,4-ethylenedioxythiophene) and 0.8 wt % of polystyrene sulfonic acid (molecular weight Mn=150,000) as conductive polymers was applied on the

TABLE 3

| | Composition of Transparent Conductive Coating Layer (wt %) | | | | | | | |
|---|---|---|---|---|---|---|---|---|
| Coating Agent | Polyester 1 | Polyester 2 | Acryl 1 | Fine Particles 1 | Fine Particles 2 | Fine Particles 3 | Additive 2 | Wetting Agent |
| Coating Solution 7 | 67 | | 20 | 3 | | | 5 | 5 |
| Coating Solution 8 | | 62 | 30 | 3 | | 5 | 5 | 5 |
| Coating Solution 9 | | | 92 | | 3 | | 5 | 5 |

Polyester 1, polyester 2, acryl 1, additive 2 and wetting agent are the same as those in Table 1.

above base material film having an intermediate layer by use of a Meyer bar and dried at 140° C. for 1 minute to obtain a transparent conductive coating layer. The thickness of the transparent conductive coating layer was 0.15 μm. Its surface resistance was 1,200Ω/□.

<Formation of Hard Coating>

To eliminate the influence of the occurrence of irreversible depressions on the film itself when a pen-based input sliding endurance test was conducted, acrylic hard coating (BEAM-SET 700 (trade name) of Arakawa Chemical Industries, Ltd.) was applied to the surface opposite to the transparent conductive coating layer of the above conductive film by use of a Meyer bar, predried at 60° C. for 30 seconds and then irradiated with ultraviolet radiation with an energy of 1,000 mJ to obtain a hard coating layer. The thickness of the hard coating layer was 8 μm. The properties of the obtained conductive films are shown in Table 4.

TABLE 4

| | Coating Agent | Thickness of Intermediate layer (nm) | Refractive Index of Intermediate Layer | Total Light Transmittance (%) | Adhesion | Haze (%) | Reflectivity (%) | Pen-based Input Sliding Endurance |
|---|---|---|---|---|---|---|---|---|
| Ex. 7 | Coating Solution 7 | 45 | 1.58 | 88 | 5 | 0.8 | 2.4 | 170,000 |
| Ex. 8 | Coating Solution 8 | 45 | 1.57 | 88 | 5 | 1.1 | 2.6 | 150,000 |
| C. Ex. 6 | Coating Solution 9 | 45 | 1.52 | 87 | 2 | 0.9 | 3.9 | 60,000 |

Ex.: Example, C. Ex.: Comparative Example

As is clear from Table 2, the conductive laminated film of the present invention enjoys good adhesion of the transparent conductive coating layer and can maintain sufficient conductivity even when an external force is repeatedly applied.

Further, it is clear from Table 4 that the conductive film of the present invention shows low surface reflectivity and can be obtained as a highly useful conductive film.

The conductive laminated film of the present invention has excellent transparency and conductivity and enjoys good adhesion of the transparent conductive coating layer. Therefore, it can maintain sufficient conductivity even when an external force is repeatedly applied. The conductive laminated film of the present invention can be suitably used as a transparent electrode or electromagnetic shielding material for a transparent touch panel, liquid crystal display (LCD), organic electroluminescent device and inorganic electroluminescent device.

What is claimed is:

1. A conductive laminated film which comprises:
a base material film,
an intermediate layer that comprises a resin composition containing a polyester resin and an acrylic resin having an oxazoline group and a polyalkylene oxide chain and that is situated on one or both surfaces of the base material film, and
a transparent conductive coating layer situated on one of the intermediate layers,
and which has a total light transmittance of at least 60% and a surface resistance value of $1\times10^1$ to $1\times10^4 \Omega/\square$,
wherein the transparent conductive coating layer comprises a conductive polymer which comprises a polythiophene polycation having a recurring unit represented by the following formula (1):

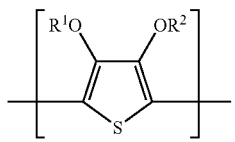

(1)

wherein $R^1$ and $R^2$ each independently represent a hydrogen atom or an alkyl group having 1 to 4 carbon atoms or join together to represent a $C_1$ to $C_{12}$ alkylene group which may be substituted,
and a polyanion, the thickness of the transparent conductive coating layer being 0.01 to 0.30 μm,
and wherein the intermediate layer has a refractive index of 1.53 to 1.63 and a thickness of 0.01 to 0.10 μm.

2. The conductive laminated film according to claim 1, wherein the transparent conductive coating layer comprises a reaction product of the conductive polymer which comprises the polythiophene polycation having the recurring unit represented by the formula (1) and a polyanion and at least one silane compound selected from the group consisting of tetraalkoxysilane and trialkoxysilane having a reactive functional group other than an alkoxy group.

3. The conductive laminated film according to claim 2, wherein the trialkoxysilane having a reactive functional group other than an alkoxy group is trialkoxysilane having a glycidyloxy group.

4. The conductive laminated film according to claim 1, wherein the base material film comprises polyethylene terephthalate or polyethylene-2,6-naphthalene dicarboxylate.

5. The conductive laminated film according to claim 1, wherein the resin composition constituting the intermediate layer further contains fine particles, and the difference between the refractive index of the fine particles and the refractive index of the resin constituting the resin composition is not larger than 0.02.

6. The conductive laminated film according to claim 5, wherein the fine particles comprise a composite oxide of silica and titanium oxide.

7. The conductive laminated film according to claim 1, wherein the intermediate layer is formed concurrently with production of the base material film.

8. The conductive laminated film according to claim 1, having a surface reflectivity at a wavelength of 550 nm of not higher than 3%.

9. The conductive laminated film according to claim 1, having a haze value of lower than 1.5%.

* * * * *